Jan. 18, 1927. 1,615,196
A. LILJA
JAR OPENER
Original Filed July 18, 1924
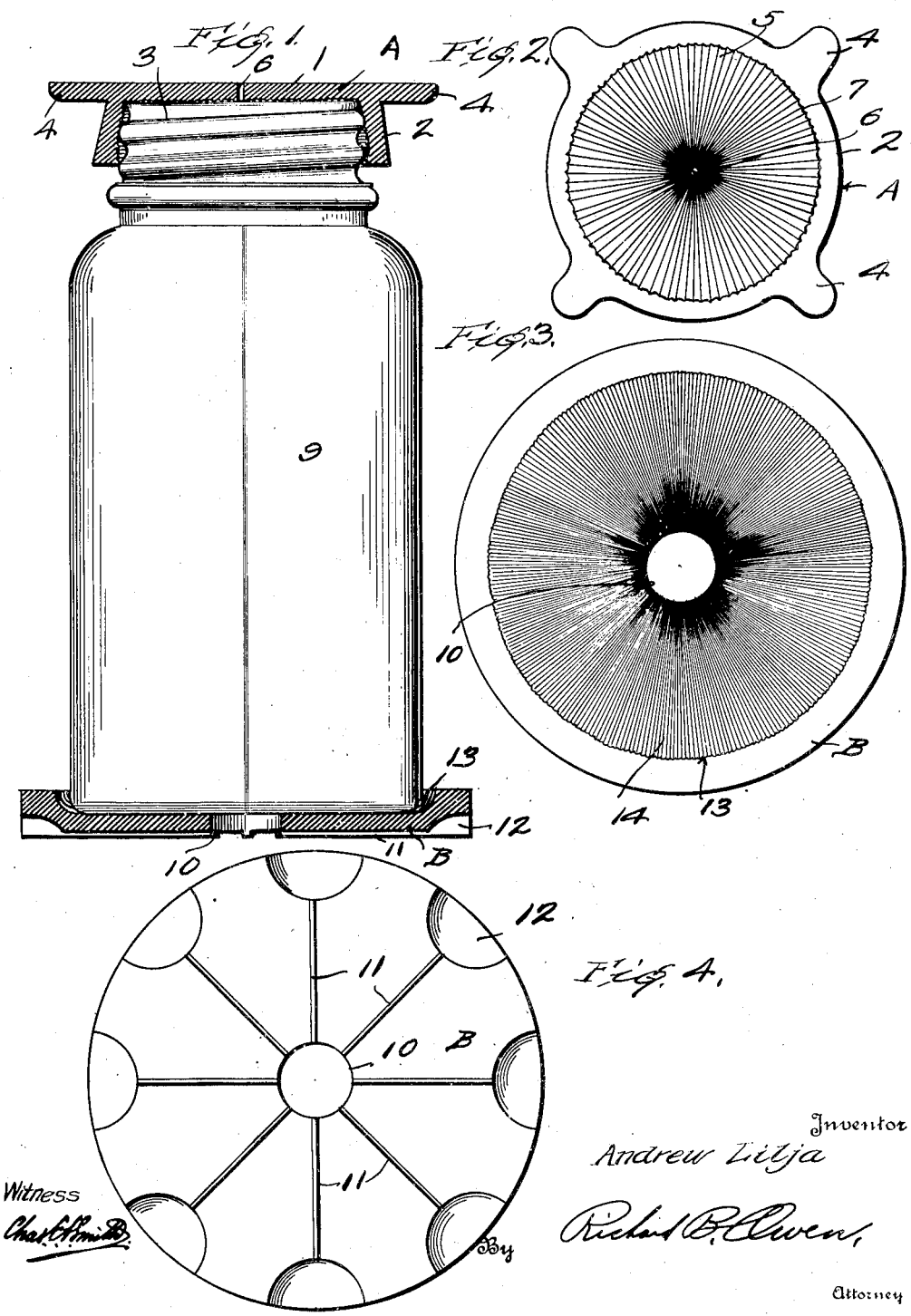
Inventor
Andrew Lilja

UNITED STATES PATENT OFFICE.

ANDREW LILJA, OF BELVIDERE, SOUTH DAKOTA.

JAR OPENER.

Application filed July 18, 1924, Serial No. 726,877. Renewed June 11, 1926.

The present invention relates to a jar opener and has for its prime object to provide a device whereby the cover of the ordinary glass jar may be easily screwed therefrom.

The invention further contemplates the provision of a device of this nature which may be manufactured and sold at a low cost, possessing a very simple structure which is reliable, durable, easily used, and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing:

Figure 1 is a vertical section through the remover showing the same applied to a jar, Figure 2 is a bottom plan view of the cover engaging member, Figure 3 is a top plan view of the jar engaging member, and Figure 4 is a bottom plan view thereof.

Referring to the drawing in detail it will be seen that the device consists of a cover engaging element A and a jar engaging element B. These elements are constructed so as to frictionally engage the cover and jar respectively so that the cover may be easily and quickly removed from the jar without any danger of breaking the jar or injuring the cover.

The cover engaging element A consists of a circular plate 1 having a depending annular flange 2 flaring outwardly toward its bottom to conform to the general configuration of the jar cover 3. A series of lugs 4 project radially from the outer edge of the plate 1. A plurality of ridges are provided in the interior of the cover engaging element, the ridges 5 radiating from a central opening 6 provided in the plate 1, these ridges being situated on its under or inner face and ridges 7 are provided on the inside of the flange 2. It will be seen that the cover engaging element may be placed over the cover 3 as indicated to advantage in Figure 1 so as to frictionally grip the same. Thus the hand may be grasped over the element and the cover 3 readily unscrewed when the jar engaging element holds the jar 9 as will be hereinafter set forth.

The jar engaging element B is in the form of a pad having the central opening 10 and provided on its bottom face with ribs 11 radiating outwardly therefrom and terminating a distance from the outer periphery of the element B. Recesses 12 are provided on the under surface of the element B one at the outer end of each rib 11. As is indicated to advantage in Figure 1 the upper surface of the element B is dished out to provide a round recess 13 sufficiently large to receive the bottom of the jar 9. In this recess 13 there are provided the ridges 14 radiating from the center thereof. It will thus be seen that when the element B is placed on a cable or like support the jar 9 may be set therein and then the element A engaged with the cover 3. By pressing downwardly on the element A the same may then be turned to readily unscrew the cover 3 as this downward pressure will cause the element B to frictionally engage the support and bottom of the jar to prevent its turning. The element A frictionally engages the jar cover.

It is thought that the construction and operation of this invention will now be clearly understood. It is desired to point out that it is preferable to construct the elements A and B of elastic material such as rubber as such material has been found to be most efficient in practice. Numerous changes, however, in the details of construction, and in the combination and arrangement of parts may be resorted to without departing from the spirit or scope of the invention as hereinafter claimed or sacrificing any of its advantages.

Having thus described my invention, what I claim as new is:

In a jar cover remover, a combination of a cover engaging element with a jar engaging element, the cover engaging element being formed of an annular plate having lugs extended from its periphery and a flange extending from one face, said face and interior of said flange provided with ridges so that the element may frictionally engage a jar, said jar engaging element being in the form of a pad having its upper surface dished out to form a recess for receiving the bottom end of a jar, ribs formed on the bottom of said jar engaging element radiating from the center thereof and the bottom of said jar engaging element being provided with recesses one at the end of each rib, said elements being formed of elastic material.

In testimony whereof I affix my signature.

ANDREW LILJA.